United States Patent
Kuroki

[19]

[11] Patent Number: 5,910,064
[45] Date of Patent: Jun. 8, 1999

[54] DIFFERENTIAL APPARATUS

[75] Inventor: Tadashi Kuroki, Tochigi-ken, Japan

[73] Assignee: Tochigi Fuji Sangyo Kabushiki Kaisha, Japan

[21] Appl. No.: 09/007,353

[22] Filed: Jan. 15, 1998

[30] Foreign Application Priority Data

Jan. 16, 1997 [JP] Japan .................................. 9-005713

[51] Int. Cl.$^6$ .................................................. B60K 23/04
[52] U.S. Cl. ........................... 475/199; 475/198; 475/205; 475/230; 180/249
[58] Field of Search ..................................... 475/198, 199, 475/202, 204, 205, 220, 230, 231; 180/248, 249

[56] References Cited

U.S. PATENT DOCUMENTS

| | | | |
|---|---|---|---|
| 4,028,965 | 6/1977 | Stockton | 475/205 X |
| 4,671,136 | 6/1987 | Katayama | 475/198 X |
| 4,750,382 | 6/1988 | Marc | 180/249 X |
| 4,776,234 | 10/1988 | Shea . | |
| 4,781,078 | 11/1988 | Blessing et al. . | |
| 4,838,118 | 6/1989 | Binkley . | |
| 4,967,861 | 11/1990 | Oyama et al. | 475/230 X |
| 5,019,021 | 5/1991 | Janson . | |
| 5,021,038 | 6/1991 | Beigang . | |
| 5,030,181 | 7/1991 | Keller . | |
| 5,102,378 | 4/1992 | Gobert . | |
| 5,135,071 | 8/1992 | Shibahata et al. | 180/249 |
| 5,141,072 | 8/1992 | Shibahata . | |
| 5,156,578 | 10/1992 | Hirota . | |
| 5,161,636 | 11/1992 | Haupt et al. | 180/248 |
| 5,269,730 | 12/1993 | Hirota . | |
| 5,326,333 | 7/1994 | Niizawa . | |
| 5,350,340 | 9/1994 | Paul et al. | 475/231 X |
| 5,366,421 | 11/1994 | Hirota . | |
| 5,370,588 | 12/1994 | Sawase et al. | 475/199 X |
| 5,396,421 | 3/1995 | Niikura et al. | 180/248 X |
| 5,417,298 | 5/1995 | Shibahata | 180/249 X |
| 5,458,547 | 10/1995 | Teraoka et al. . | |
| 5,624,343 | 4/1997 | Krisher | 475/230 X |

FOREIGN PATENT DOCUMENTS

| | | |
|---|---|---|
| 0 548 853 | 6/1993 | European Pat. Off. . |
| 0 575 151 | 12/1993 | European Pat. Off. . |
| 4027368 | 3/1992 | Germany . |

Primary Examiner—Dirk Wright
Assistant Examiner—Peter T. Kwon
Attorney, Agent, or Firm—Graham & James LLP

[57] ABSTRACT

A differential mechanism has a differential casing for receiving drive power from an engine and a pair of output members for distributing the received drive power to road wheel ends. A pair of drive power control mechanisms each respectively comprise a combination of a speed change mechanism and a friction clutch for a serial connection between the differential casing and either output member or between the output members and an actuator for actuating the friction clutch to be let in. A controller controls a pair of the actuators to have a pair of the friction clutches periodically let in and let out in an alternating manner with a relatively short period.

8 Claims, 7 Drawing Sheets

DIFFERENTIAL APPARATUS

BACKGROUND OF THE INVENTION

1. Field of the Invention

The present invention relates to a differential apparatus for vehicles.

2. Description of Relevant Art

Figure 1:
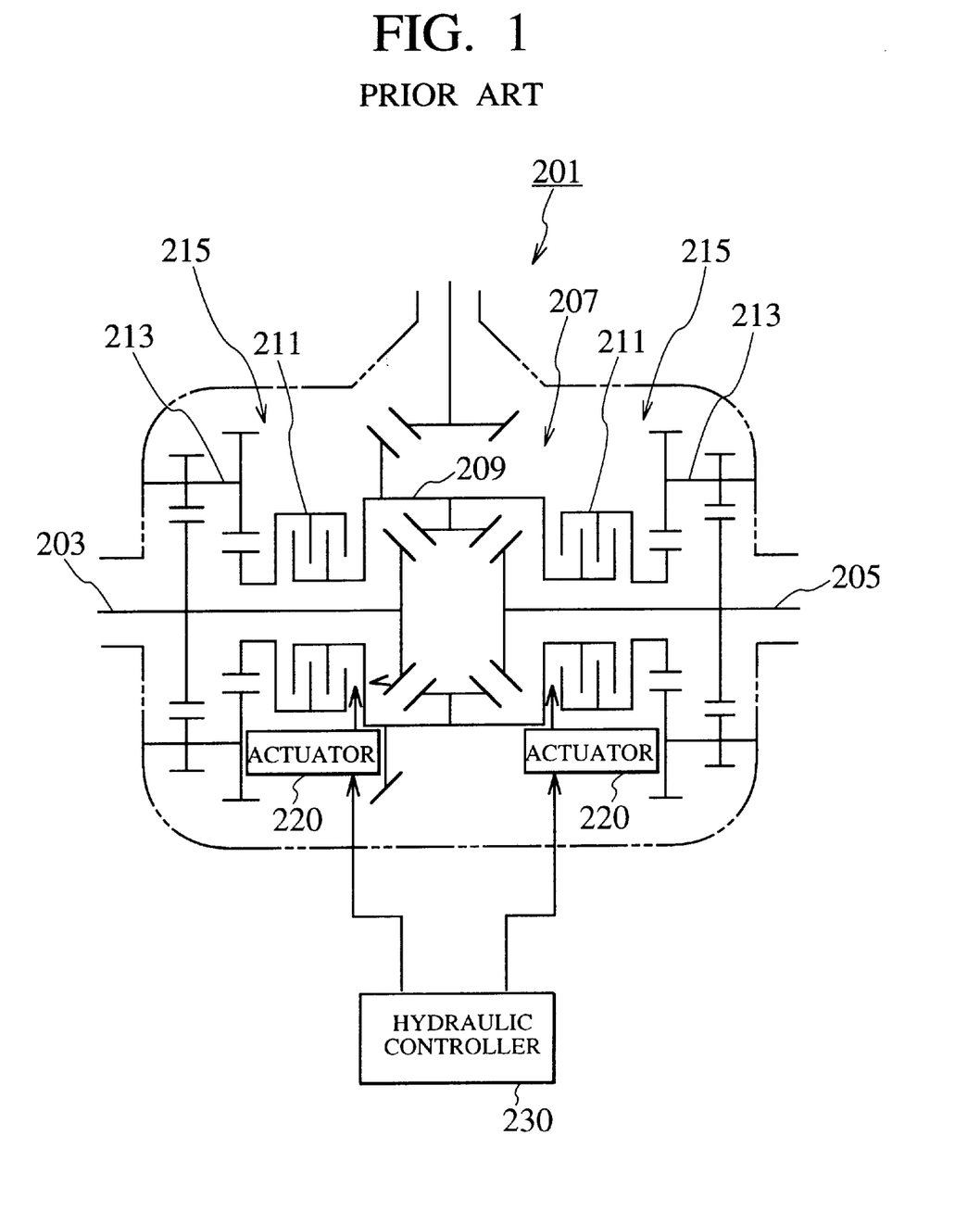
FIG. 1 is a drive power and hydraulic control connection diagram of essential elements of a conventional differential apparatus.

There has been disclosed in Japanese Patent Application Laid-Open Publication No. 7-156681 a differential apparatus of an arrangement shown in FIG. 1, where it is designated by reference character 201.

The differential apparatus 201 includes a differential mechanism 207 for distributing drive power from an engine to a pair of left and right drive axles 203, 205, a pair of left and right drive power control mechanisms 215 each comprising a combination of a multi-plate clutch 211 and a speed change mechanism 213 for a serial connection between a differential casing 209 of the mechanism 207 and the left or right axle 203 or 205, and a hydraulic actuator 220 for actuating the clutch 211 to be internally coupled for the connection, and a hydraulic controller 230 for controlling the actuator 220 to have the clutch 211 coupled.

If the multi-plate clutch 211 of the left drive power control mechanism 215 is coupled, drive power distributed to the left axle 203 has its fraction fed back via the speed change mechanism 213 and that clutch 211 to the differential casing 209, with the more distributed drive power at the right axle 205 end. To the contrary, if the multi-plate clutch 211 of the right drive power control mechanism 215 is coupled, drive power distributed to the right axle 205 has its fraction fed back to via the speed change mechanism 213 and this clutch 211 to the differential casing 209, with the more distributed drive power at the left axle 203 end.

The controller 230 is thus adaptive for coupling the multi-plate clutch 211 of the left or right drive power control mechanism 215 to control a yaw momentum of a vehicle body, securing a stable straight forward travel as well as a comfortable steering to turn.

More specifically, when the vehicle body in travel has entered a yawing due to a slipping road wheel at the left or right axle 203 or 205 end, the drive power control mechanisms 215 are controlled to stop the slipping.

It therefore is impossible for the differential apparatus 201 to limit a developing difference at the differential mechanism 207 before the road wheel slips, and to effect a prevention of a wheel slippage before a development of yaw momentum on the vehicle body in a straight forward travel.

The respective multi-plate clutches 211, which are arranged between the differential casing 209 and the left and right axle 203, 205, might have been operated for a use of their frictional torque to limit a difference development at the differential mechanism 207. However, if the clutches 211 were both coupled for the difference limitation, those fractions of drive power fed back from the left and right axle 203, 205 ends would have canceled each other. Still worse, during such the limitation, the multi-plate clutches 211 should have stood with a big burden due to slippage, resulting in a reduced service life.

In addition, associated drive torque to be fed back is subjected to an amplification at the speed change mechanism 213 adversely affecting the vehicle body in performance, rendering control of difference limitation very difficult.

The differential apparatus 201 may involve a difference limiting mechanism, with an arrangement the more complicated, large sized, increased in weight and dear of cost.

Figure 2:
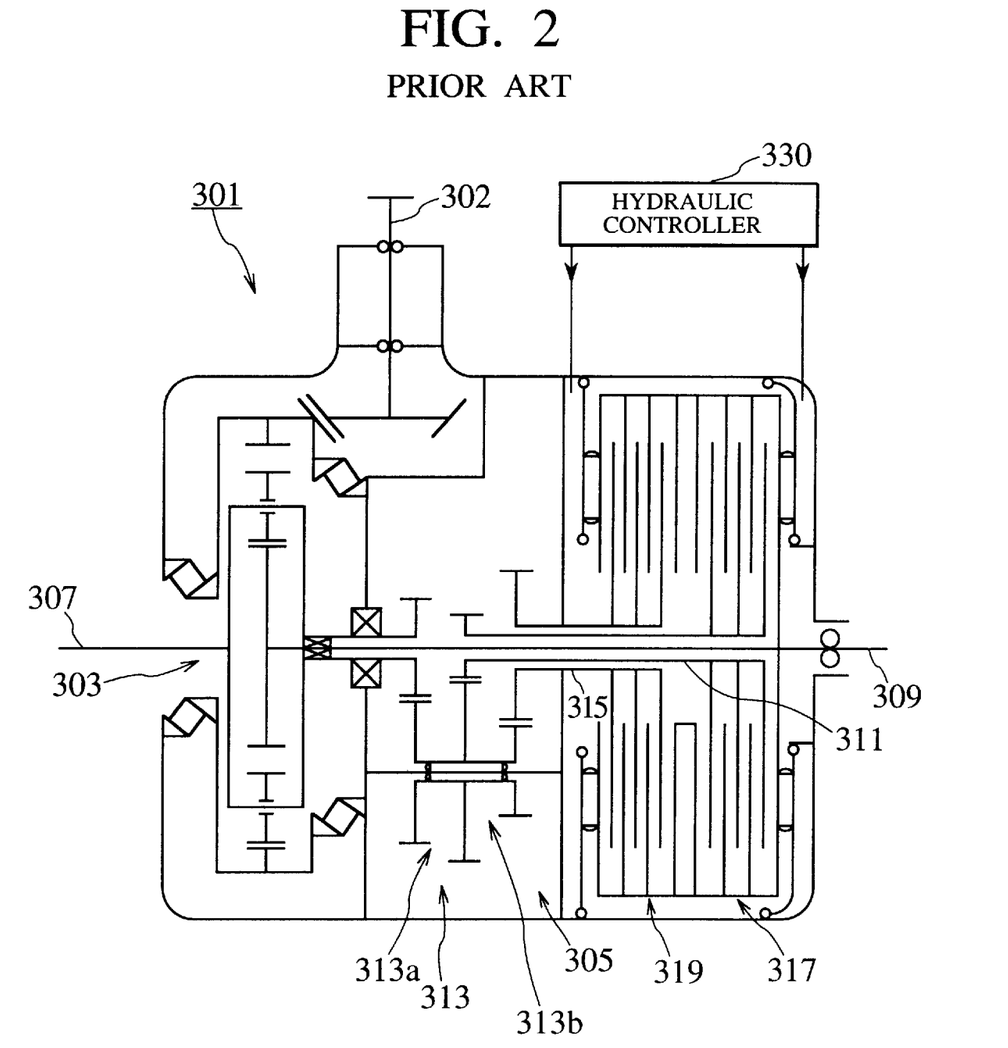
FIG. 2 is a drive power and hydraulic control connection diagram of essential elements of another conventional differential apparatus.

There has been disclosed in Japanese Patent Application Laid-Open Publication No. 5-345535 another differential apparatus shown in FIG. 2, where it is designated by reference character 301.

The differential apparatus 301 comprises an input part 302 for inputting drive power from an engine, a differential mechanism 303 of a planetary gear type, and a drive power control mechanism 305.

The drive power control mechanism 305 includes a speed changing mechanism 313 as an integrated combination of a speed increasing mechanism 313a for transmitting a fraction of drive power of a left drive axle 307 to a first intermediate shaft 311, with an increased revolution speed, and a speed decreasing mechanism 313b for transmitting a fraction of drive power of the left axle 307 to a second intermediate shaft 315, with a decreased revolution speed. The control mechanism 305 further includes a hydraulically actuatable first multi-plate clutch 317 to be coupled for interconnection between the first intermediate shaft 311 and a right drive axle 309, and a hydraulically actuatable second multi-plate clutch 319 to be coupled for interconnection between the second intermediate shaft 315 and the right axle 309.

In other words, the drive power control mechanism 305 is adaptive for a serial connection between the left and right axles 307, 309 with the first and second multi-plate clutches 317, 319 controlled to be either coupled by a hydraulic controller 330 to achieve a secured stable straight forward travel as well as a comfortable steering to turn.

This differential apparatus 301 has similar issues to that differential apparatus 201.

SUMMARY OF THE INVENTION

The present invention has been achieved with such points in view.

It therefore is an object of the present invention to provide a differential apparatus permitting a yaw momentum of a vehicle body to be controlled without an undue burden on an associated control mechanism, and a difference limitation to be achieved without adversely affecting the vehicle body in performance nor involving a complicated arrangement, enlarged size, increased weight or dear cost.

To achieve the object, a first aspect of the invention provides a differential apparatus comprising a differential mechanism having a differential casing for receiving drive power from an engine of a vehicle and a pair of output members for distributing the received drive power to a pair of road wheel ends of the vehicle, a pair of drive power control mechanisms each respectively comprising a combination of a speed change mechanism and a friction clutch for a serial connection between the differential casing and either output member and an actuator for actuating the friction clutch to be let in, and a controller for controlling a pair of the actuators to have a pair of the friction clutches periodically let in and let out or engaged and disengaged, respectively in an alternating manner with a relatively short period.

According to the first aspect, the speed change mechanism may preferably be a speed increasing mechanism in one drive power control mechanism that may be responsible for one output member to be connected to the differential casing and a speed decreasing mechanism in the other drive control mechanism that may be responsible for another output member to be connected to the differential casing, or may preferably be a combination of a speed increasing mechanism and a speed decreasing mechanism in each of the drive power control mechanisms that may be both responsible for either output member to be connected to the differential casing.

In the former case, when the friction clutch is let in at the one drive power control mechanism in which the speed change mechanism is a speed increasing mechanism, drive power distributed at the one output member end has its fraction fed back to the differential casing, varying a proportion of drive power to be distributed to the another output member end. When the friction clutch is let in at the another drive power control mechanism in which the speed change mechanism is a speed decreasing mechanism, drive power distributed at the another output member end has its fraction fed back to the differential casing, varying a proportion of drive power to be distributed to the one output member end. A yaw momentum of a vehicle body is thus controllable, with an enhanced stability in straight forward travel as well as an improved maneuverability in turning.

In the latter case, the respective friction clutches in the drive power control mechanisms are individually let in for a transfer of drive power between the either output member and the differential casing to control a yaw momentum of a vehicle body, with an enhanced stability in straight forward travel as well as an improved maneuverability in turning.

Moreover, according to the first aspect, the paired friction clutches of the drive power control mechanisms are periodically let in and let out in an alternating manner with a relatively short period, and an apparent difference limitation is effected by contribution of frictional torque at the respective clutches, allowing for a difference limitation at the speed change mechanisms. In a straight forward acceleration for example, the differential apparatus is permitted to stop a road wheel slippage before the vehicle body turns in a yaw direction, thus successfully preventing a yawing of vehicle body due to acceleration.

Further, the paired friction clutches to be alternatively let in and let out are free from a concurrent coupling that otherwise might have caused a torque cancellation therebetween, and are effectively prevented against abrasion due to a slipping, as well as from an energy loss due to torque cancellation and an increase in fuel consumption at the engine.

Still more, a relatively short period is set for alternative make and break actions of the friction clutches to keep a normal stability in straight forward travel as well as a comfortable steering in turning, without adversely affecting the vehicle body in performance in a yaw direction.

Such the possible difference limitation permits an elimination of a dedicated difference limiting mechanism as well as of associated disadvantages such as a complicated structure, an enlarged size, an increased weight and a dear cost.

Yet more, the possible elimination of a difference limiting mechanism effectively permits the paired friction clutches of the drive power control mechanisms to be free from an undue burden due to frictional torque that otherwise might have been produced by a difference limiting friction clutch, and allows for a longer service life.

To achieve the object described, a second aspect of the invention provides a differential apparatus comprising a differential mechanism having a differential casing for receiving drive power from an engine of a vehicle and a pair of output members for distributing the received drive power to a pair of road wheel ends of the vehicle, a pair of drive power control mechanisms each respectively comprising a combination of a speed change mechanism and a friction clutch for a serial connection between the output members and an actuator for actuating the friction clutch to be let in, and a controller for controlling a pair of the actuators to have a pair of the friction clutches periodically let in and let out in an alternating manner with a relatively short period.

According to the second aspect, a differential apparatus has an analogous arrangement to the first aspect, subject to simple differences in constitution of a differential mechanism and of a pair of drive power control mechanisms interconnecting a pair of output members, and has similar functions and effects to the first aspect.

According to a third aspect of the invention, the relatively short period is shorter than a period of a proper vibration in a yawing direction of a vehicle body of the vehicle, and preferably be shorter than a period of a frequency-multiplied component of the proper vibration.

The third aspect enhances the effects of the first and second aspects. The relatively short period may be short enough for a pair of drive power control mechanisms to exhibit a secured difference limiting function, while effectively preventing an undesirable yawing of a vehicle body, permitting a stable straight forward travel as well as a comfortable turning maneuverability.

According to a fourth aspect of the invention, the alternating manner has a time interval set between a let-out of either friction clutch and a let-in of the other friction clutch.

The fourth aspect ensures the respective effects described. In a differential apparatus according to any of the first to the third aspect, a pair of friction clutches provided either in both the paired drive power control mechanisms are alternatively let in and let out. Either friction clutch to be let out may occasionally have a delayed action or dragging torque, with a maintained connection accompanied by a concurrent let-in of the other friction clutch, causing a torque circulation within the differential mechanism, with a room left for additional solutions for better prevention of drive power loss, unexpected fuel consumption, reduced service life or durability, etc.

To this point, the fourth aspect provides a time interval as an intentional delay between a let-in and a let-out of the paired friction clutches to interrupt the torque circulation, thereby effectively preventing drive power loss, unexpected fuel consumption, reduced service life, etc.

BRIEF DESCRIPTION OF THE ACCOMPANYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

There will be detailed below the preferred embodiments of the present invention with reference to the accompanying drawings. Like members are designated by like reference characters.

FIGS. 3 to 6 describe a differential apparatus according to a first embodiment addressed to the first, the third and the fourth aspect of the invention and applied to an unshown automobile. As used herein, longitudinal and transverse directions as well as left and right directions are defined relative to a vehicle body of the automobile.

Figure 3:
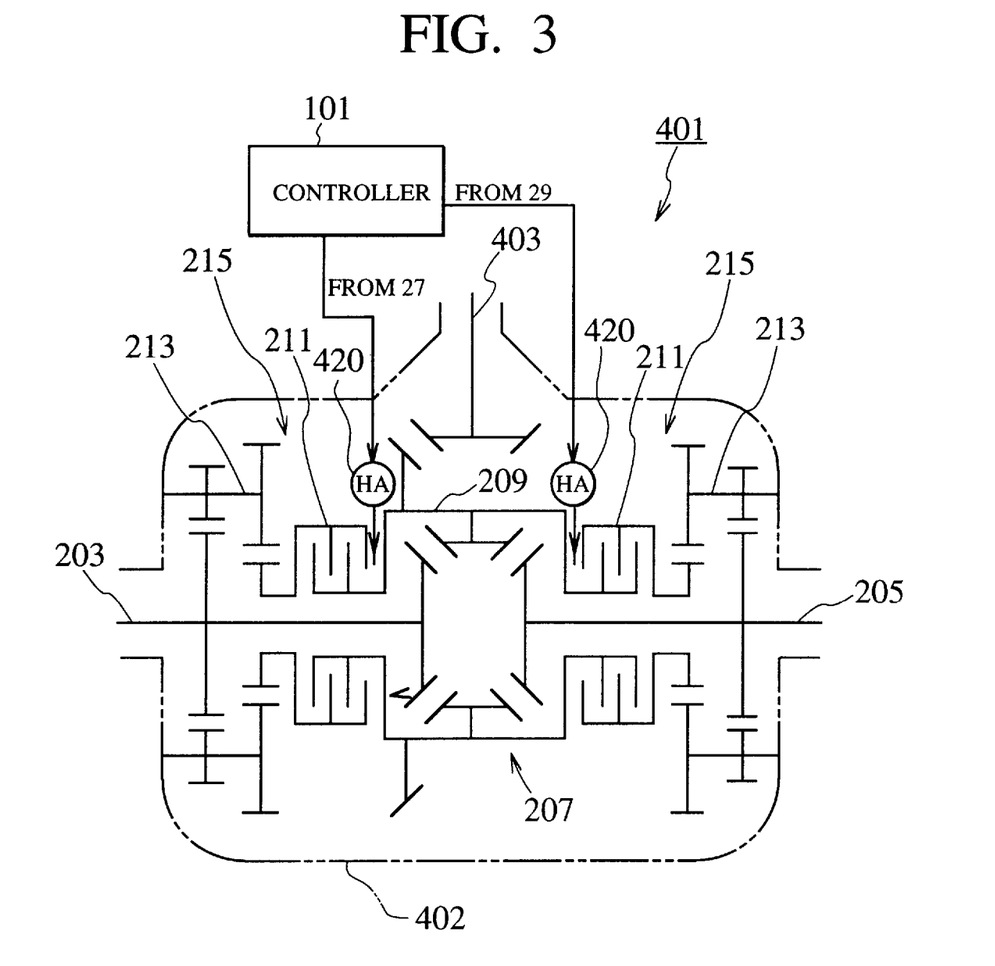
FIG. 3 is a drive power and hydraulic control connection diagram of a differential apparatus according to an embodiment of the invention, as it is applied to an automobile.

In FIG. 3, designated by reference character 401 is the differential apparatus according to the first embodiment. The differential apparatus 401 includes a differential carrier 402 disposed on a pair of left and right rear road wheel drive axles 203, 205 of the automobile and provided with a lubricant sump, which carrier 402 has a differential casing 209 of a differential mechanism 207 accommodated therein and rotatably supported by bearings, which casing 209 receives drive power transmitted thereto from an unshown engine via a transmission gear set and a propeller shaft 403, and the differential mechanism 207 distributes the received drive power to the left and right axles 203, 205.

The differential apparatus 401 further includes a pair of left and right drive power control mechanisms 215 each comprising a combination of a multi-plate clutch 211 as a pair of stationary and axially mobile sets of numbers of frictional disks and a speed change mechanism 213 for a serial connection between the differential casing 209 and the left or right axle 203 or 205, and a hydraulic actuator 420 for hydraulically actuating the mobile set of frictional disks of the clutch 211 to be let in and let out or engaged and disengaged, in a later-described manner, and a controller 101 for controlling the respective actuators 420.

Figure 4:
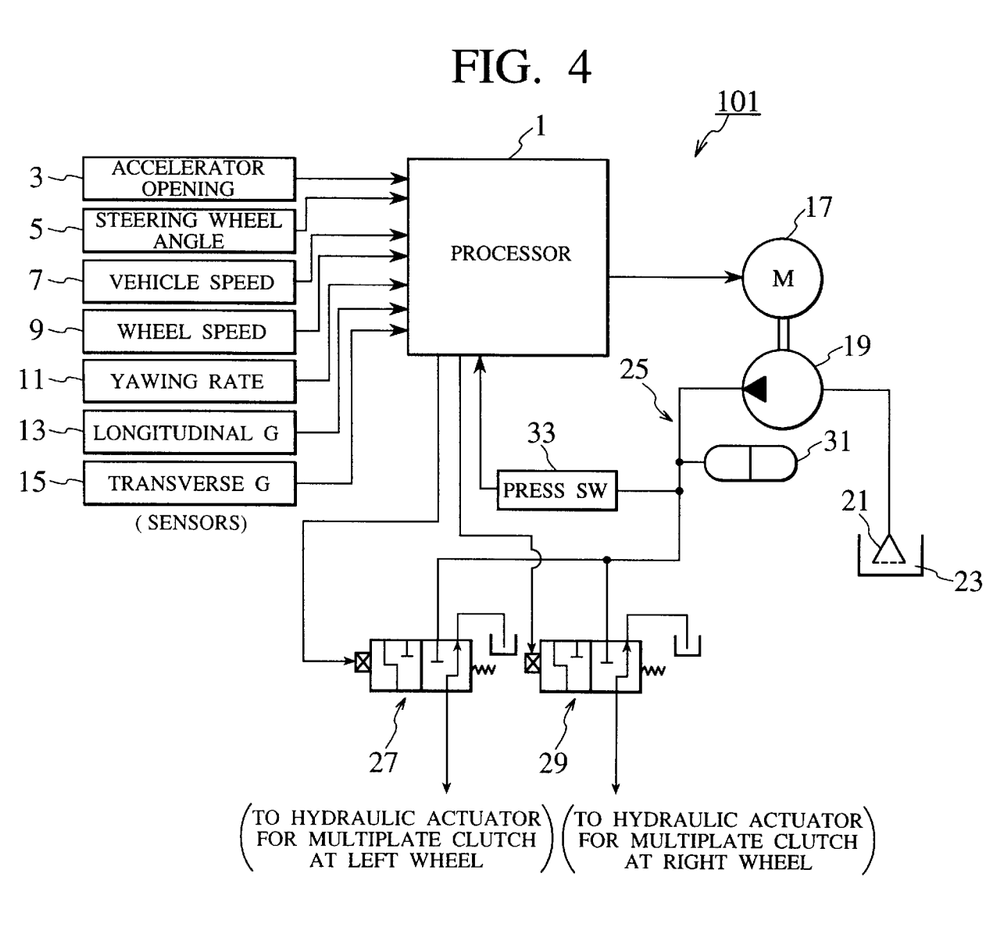
FIG. 4 is a block diagram of a controller of the differential apparatus of FIG. 3.

FIG. 4 shows an entire system of the controller 101 including a signal processing microcomputer unit (hereafter "processor") 1 that governs a pair of hydraulic linear solenoid valves 27, 29.

The processor 1 processes detection signals from various traveling state sensors including an accelerator opening sensor 3 for detecting an opening of an accelerator, a steering wheel angle sensor 5 for detecting a steered angle of a steering wheel, a vehicle speed sensor 7 for detecting a travel speed of the automobile, a wheel speed sensor 9 for detecting a revolution speed of each road wheel, a yawing rate sensor 11 for detecting a yawing rate of the vehicle body, a longitudinal gravity sensor 13 for detecting a longitudinal component of an inertial gravity of the automobile, and a transverse gravity sensor 15 for detecting a transverse component of the inertial gravity, and determines or predicts concerned factors of a traveling state of the automobile and how a phase difference develops between associated road wheels.

The processor 1 drives an electric motor 17 to actuate a hydraulic pump 19 so that oil is pumped from an oil reservoir 23 through an oil strainer 21, supplying a hydraulic circuit 25 with a corresponding hydraulic pressure, which pressure is accumulated at an accumulator 31, kept over a preset value of a pressure switch 33, and on-off controlled by the linear solenoid valves 27, 29 to be transmitted to the hydraulic actuators 420, respectively. If the hydraulic pressure gets lower than the preset value, the pressure switch 33 is operated to send a signal to the processor 1, where it is processed to control the electric motor 17, as necessary.

The processor 1 employs the results of data analysis and prediction for controlling the solenoid valves 27, 29 to drive the hydraulic actuators 420, effecting individual actuation of the multi-plate clutches 211.

If the multi-plate clutch 211 of the drive power control mechanism 215 associated with the left axle 203 is let in, a fraction of distributed power at the left axle 203 end is fed back via the clutch 211 to the differential casing 209, so that the more power is distributed to the right axle 205 end. To the contrary, if the multi-plate clutch 211 associated with the right axle 205 is let in, distributed power at the left axle 203 end is likewise increased.

Such redistribution of drive power between the left and right axles 203, 205 causes a yaw momentum of the vehicle body to be varied. A reduced yaw momentum permits a more stable straight forward travel as well as an improved turning maneuverability. The variation of yaw momentum is related to a proper vibration of the vehicle body, and depends on a frequency of occurrences of power redistribution or on-off switchover between clutches 211.

The processor 1 has a memory for storing various technical data of the automobile including a frequency of a proper vibration in a yawing direction of the vehicle body.

Figure 5:
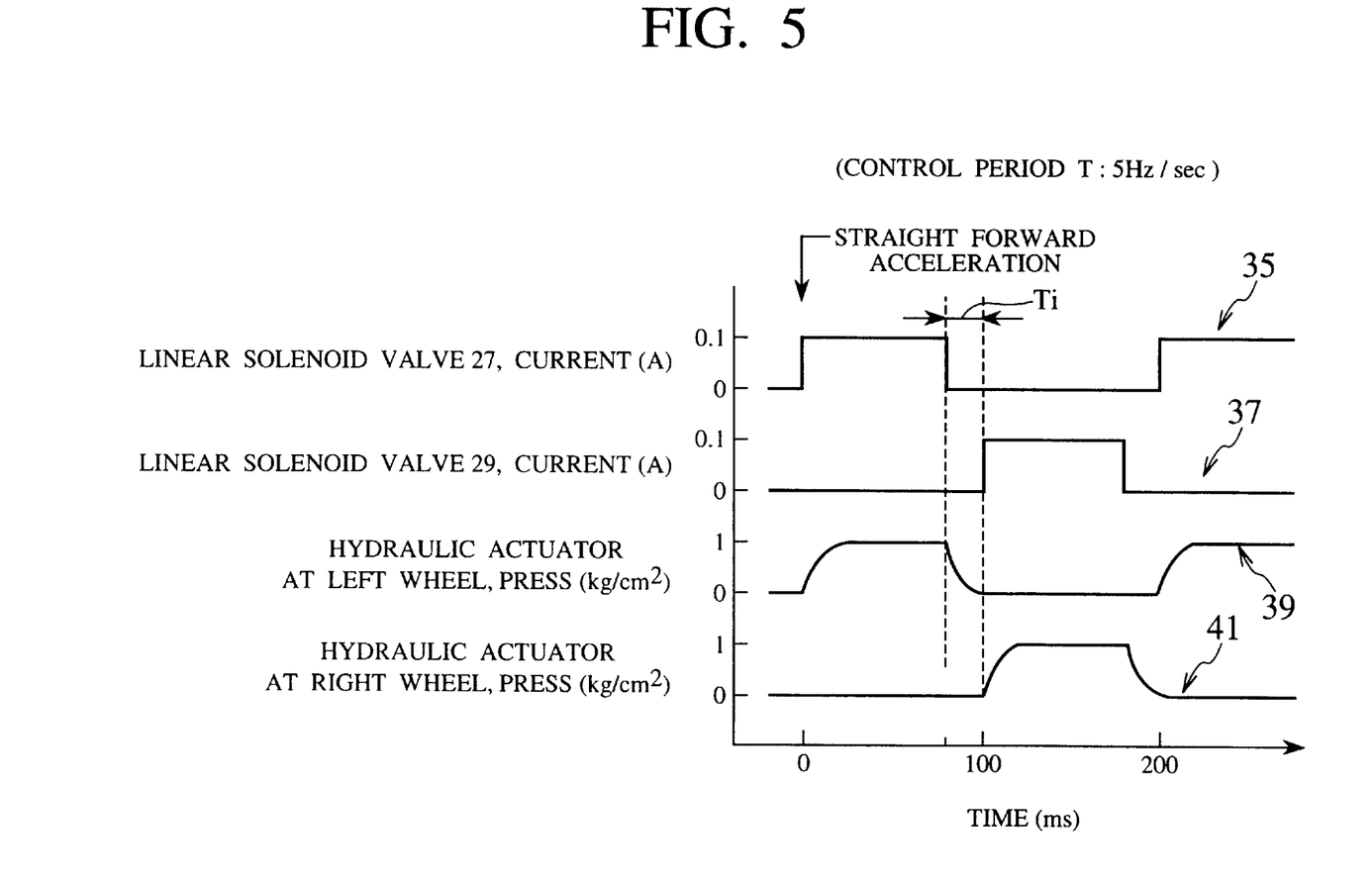
FIG. 5 is a time chart describing control actions for a periodical switchover between a pair of drive power control mechanisms of the differential apparatus of FIG. 3.

FIG. 5 shows an exemplary clutch on-off switchover performed by alternatively turning on and off the solenoid valves 27, 29 at cyclic periods of a 5 Hz/sec (a period of 200 ms) controlled by the processor 1. The solenoid valves 27, 29 are operated with control currents 35, 37 from the processor 1, respectively, and the actuators 420 associated with left and right wheels are controlled with correspondent hydraulic pressures 39, 41 to let the multi-plate clutches 211 in and out, respectively.

The control current 37 for the solenoid valve 29 keeps a low level after the control current 35 for the solenoid valve 27 has fallen, and with a lapse of a preset delay time Ti it rises. Likewise, after the current 37 for the valve 29 has fallen, the current 35 for the valve 27 keeps a low level and, with a lapse of the delay time Ti, it rises. The hydraulic pressures 39, 41 exhibit correspondent variations, as a matter of course.

Figure 6:
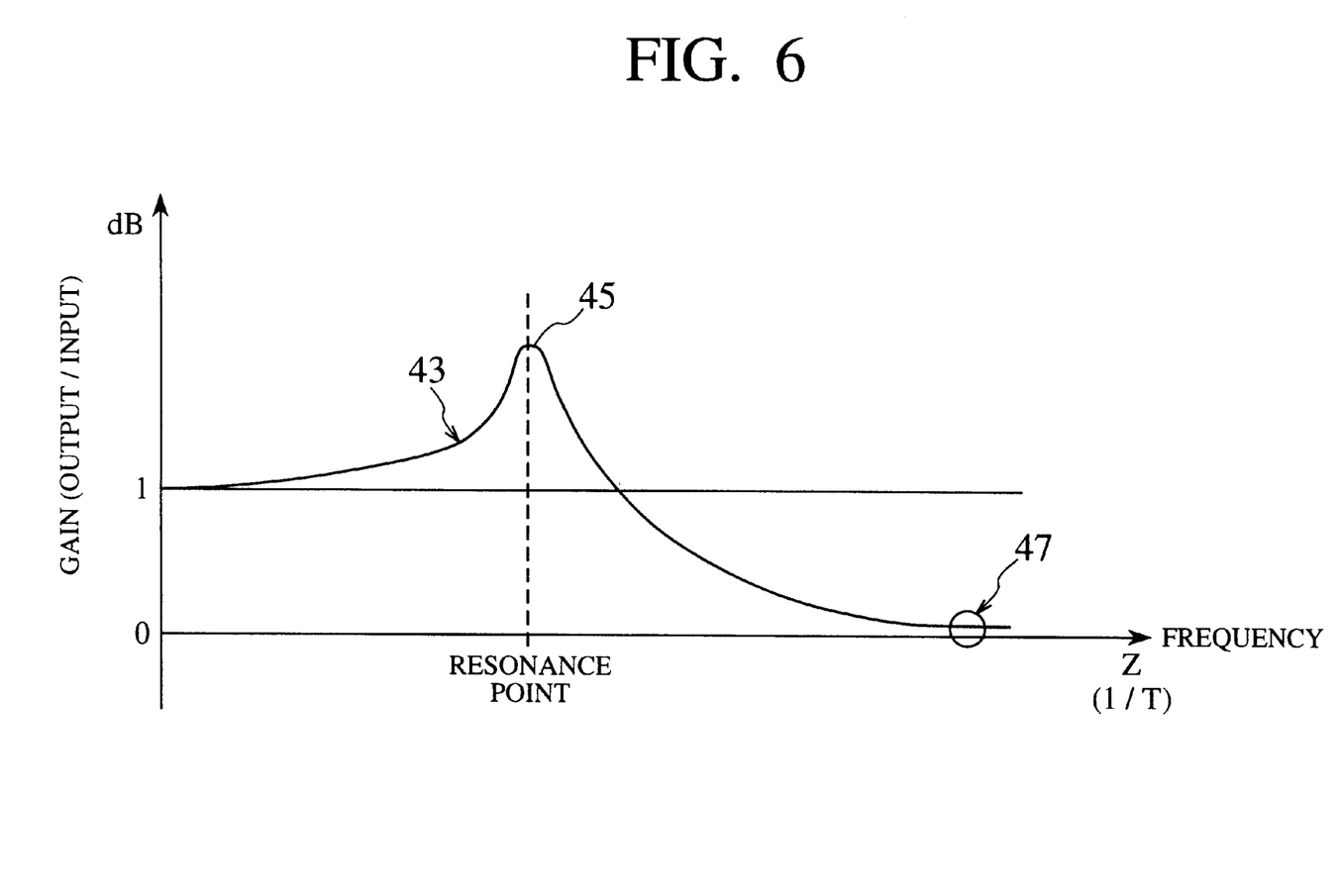
FIG. 6 is a graph describing an effect of a period of the switchover of FIG. 5, as it is sufficiently shorter than that of a proper vibration in a yaw direction of a vehicle body of the automobile to exhibit performances free from influences of the switchover.

FIG. 6 shows a relationship as a characteristic curve 43 between an output/input gain (as a resultant effect) in a dB value and a frequency Z (an inverse of a period T) of occurrences of an on-off switchover of solenoid valves 27, 29 and hence of clutches 211. A peak 45 of the curve 43 coincides with a resonance point of the proper vibration of the vehicle body, where the vehicle body has an enhanced yaw momentum.

As will be seen from the curve 43, as the frequency Z increases, the dB gain progressively becomes high up to the peak 45, and gradually becomes low, sloping under a 1 dB line, as the frequency Z goes away from the resonance point, which means a sufficiently high voluntarily selective frequency 47 permits the on-off switchover to be performed without affecting the vehicle body in yaw momentum.

A selective range of frequency Z corresponds to a range of control period T equivalent to or shorter than one fourth of one second. The example of FIG. 5 employing a 200 ms period is short enough to clear not only the peak 45 at the resonance point or a proper vibration frequency but also a frequency-multiplied or high-frequency component of the proper vibration.

It will be understood that the first embodiment provides the effects of the first, the third and the fourth aspect described. It will also be understood that the differential apparatus 401 is applicable to any of a front differential for distribution of drive power from an engine to a pair of left and right front wheel, a rear differential for engine power distribution to a pair of rear wheels, and a center differential for power distribution between front and rear drive trains for driving front wheels and rear wheels, respectively.

Figure 7:
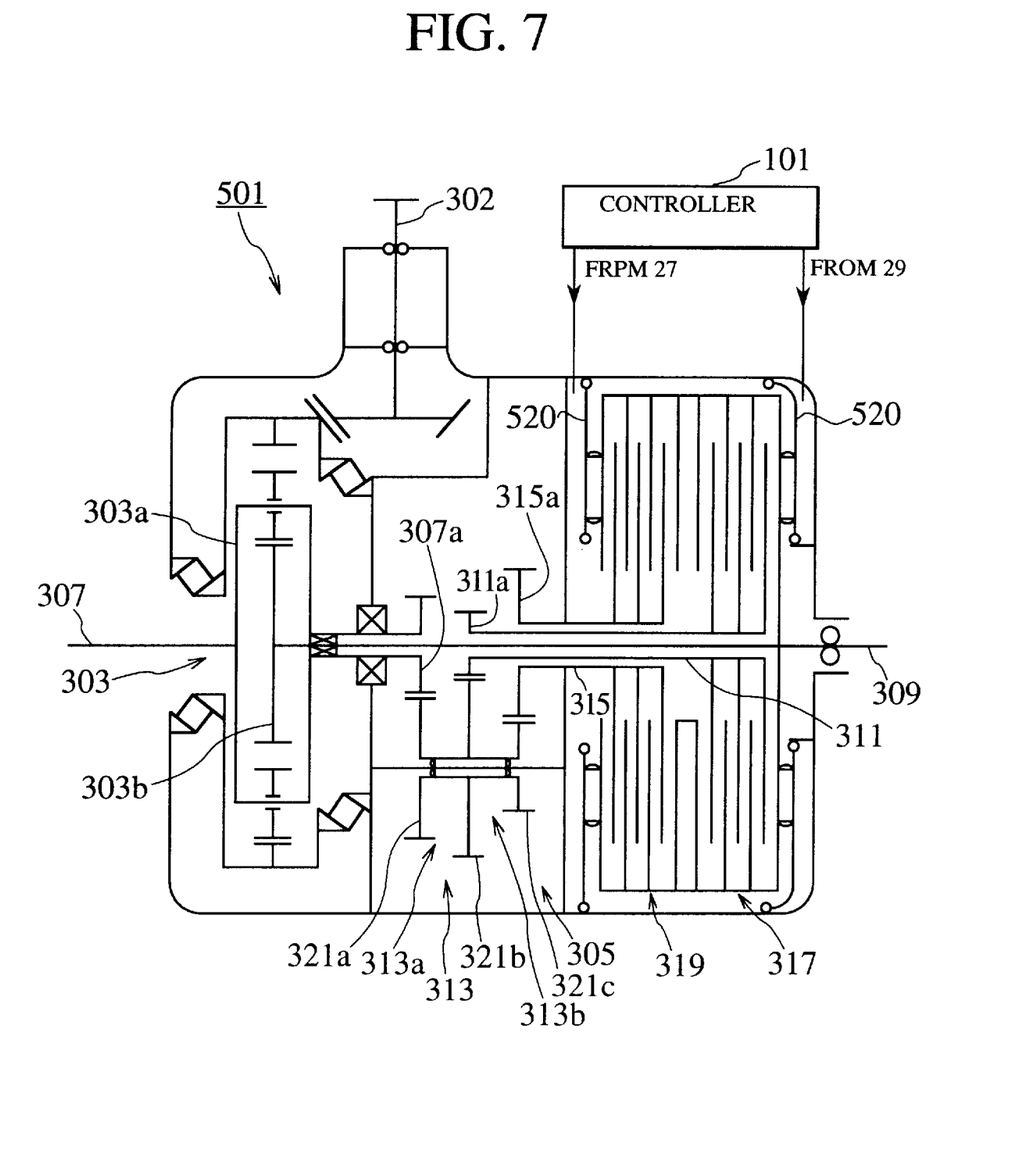
FIG. 7 is a drive power and hydraulic control connection diagram of a differential apparatus according to another embodiment of the invention.

FIG. 7 shows a differential apparatus 501 according to a second embodiment as a combination of the second to the fourth aspect of the invention.

In the differential apparatus 501, drive power from an engine is input via an input part 302 to a differential mechanism 303 of a planetary gear type, where it is distributed through a pinion carrier 303a to a left axle 307 and through a sun gear 333b to a right axle 309, while an intermediate gear 307a provided for the pinion carrier 303a is connected on the one hand via gears 321a, 321b, 311a of a speed changing mechanism 313 to a first intermediate shaft 311 and via a frictional multi-plate clutch 317 to the right axle 309 and on the other hand via gears 321a, 321c, 315a of the mechanism 313 to a second intermediate shaft 315 and via a frictional multi-plate clutch 319 to the right axle 309.

The multi-plate clutches 317, 319 are individually actuatable with hydraulic actuators 520 controlled from linear solenoid valves 27, 29 of a controller 101 in a similar manner to the first embodiment. In a drive power control mechanism 305, the speed changing mechanism 313 serves as a speed increasing mechanism 313a due to tooth number relationships of meshing gears 307a and 321a, 321b, 311a when the clutch 317 is let in, and as a speed reducing mechanism 313b due to tooth number relationships of meshing gears 307a and 321a, 321c, 315a when the clutch 319 is let in. Therefore, with the clutch 317 let in, the left and right axles 307, 309 have decreased and increased drive torque, respectively, and with the clutch 319 let in, they have inversely varied torque. As a pair of connection patterns of the drive power control mechanism 350 are controlled from the controller 101 in the described manner, there can be achieved the effects of the second to the fourth aspect, i.e., analogous effects to the first embodiment.

While preferred embodiments of the present invention have been described using specific terms, such description is for illustrative purposes, and it is to be understood that changes and variations may be made without departing from the spirit or scope of the following claims.

What is claimed is:

1. A differential apparatus comprising:
a differential mechanism having:
   a differential casing for receiving drive power from an engine of a vehicle; and
   a pair of output members for distributing the received drive power to a pair of left and right axles of the vehicle;
a pair of drive power control mechanisms each respectively comprising:
   a combination of a speed change mechanism and a friction clutch for a serial connection between the differential casing and either output member; and
   an actuator for actuating the friction clutch to be engaged; and
a controller for controlling a pair of the actuators to have a pair of the friction clutches periodically engaged and disengaged in an alternating manner with a relatively short period.

2. A differential apparatus according to claim 1, wherein the relatively short period is shorter than a period of a permissive vibration in a yawing direction of a vehicle body of the vehicle.

3. A differential apparatus according to claim 2, wherein the relatively short period is shorter than a period of a frequency-multiplied component of the permissive vibration.

4. A differential apparatus according to claim 1, wherein the alternating manner has a time interval set between a disengaged of either friction clutch and an engaged of the other friction clutch.

5. A differential apparatus comprising:
a differential mechanism having:
   a differential casing for receiving drive power from an engine of a vehicle; and
   a pair of output members for distributing the received drive power to a pair of left and right axles of the vehicle;
a pair of drive power control mechanisms each respectively comprising:
   a combination of a speed change mechanism and a friction clutch for a serial connection between the output members; and
   an actuator for actuating the friction clutch to be engaged; and
a controller for controlling a pair of the actuators to have a pair of the friction clutches periodically engaged and disengaged in an alternating manner with a relatively short period.

6. A differential apparatus according to claim 5, wherein the relatively short period is shorter than a period of a permissive vibration in a yawing direction of a vehicle body of the vehicle.

7. A differential apparatus according to claim 6, wherein the relatively short period is shorter than a period of a frequency-multiplied component of the permissive vibration.

8. A differential apparatus according to claim 5, wherein the alternating manner has a time interval set between a disengaged of either friction clutch and an engaged of the other friction clutch.

* * * * *